US009965419B1

(12) United States Patent
Wen et al.

(10) Patent No.: US 9,965,419 B1
(45) Date of Patent: May 8, 2018

(54) MULTIPLE-QUEUE INTEGER COALESCING MAPPING ALGORITHM WITH SHARED BASED TIME

(71) Applicant: Ampere Computing LLC, Santa Clara, CA (US)

(72) Inventors: Shushan Wen, Pleasant Hill, CA (US); Keyur Chudgar, San Jose, CA (US); Iyappan Subramanian, Santa Clara, CA (US)

(73) Assignee: Ampere Computing LLC, Santa Clara, CA (US)

( * ) Notice: Subject to any disclaimer, the term of this patent is extended or adjusted under 35 U.S.C. 154(b) by 205 days.

(21) Appl. No.: 15/015,338

(22) Filed: Feb. 4, 2016

(51) Int. Cl.
*G06F 13/38* (2006.01)
*G06F 13/362* (2006.01)
*G06F 1/10* (2006.01)

(52) U.S. Cl.
CPC .............. *G06F 13/362* (2013.01); *G06F 1/10* (2013.01)

(58) Field of Classification Search
None
See application file for complete search history.

(56) References Cited

U.S. PATENT DOCUMENTS

| 7,779,164 | B2 | 8/2010 | Hendel et al. |
| 8,200,857 | B2 | 6/2012 | Noeldner et al. |
| 8,244,946 | B2 * | 8/2012 | Gupta ................... G06F 9/4812 710/260 |
| 8,635,407 | B2 * | 1/2014 | Cleveland ............. G06F 3/0689 711/103 |
| 8,738,860 | B1 | 5/2014 | Griffin et al. |
| 8,959,067 | B1 | 2/2015 | Patiejunas et al. |
| 8,997,103 | B2 | 3/2015 | Gadre et al. |
| 9,008,113 | B2 * | 4/2015 | Pope ..................... G06F 13/128 370/419 |
| 9,031,094 | B2 | 5/2015 | Masputra et al. |
| 9,063,825 | B1 | 6/2015 | Bao |
| 9,069,609 | B2 | 6/2015 | Abdalla et al. |
| 9,176,820 | B2 | 11/2015 | Sinha et al. |
| 9,213,652 | B1 | 12/2015 | Miao et al. |
| 9,507,654 | B2 * | 11/2016 | Wilson ..................... G06F 9/546 |
| 9,626,309 | B1 * | 4/2017 | Burke ................. G06F 13/1642 |
| 2012/0137029 | A9 * | 5/2012 | Hsin ..................... G06F 1/3209 710/22 |
| 2017/0078890 | A1 * | 3/2017 | Zhu ....................... H04W 16/14 |

* cited by examiner

*Primary Examiner* — Cheng-Yuan Tseng
(74) *Attorney, Agent, or Firm* — Alston & Bird LLP

(57) ABSTRACT

A mapping technique sets coalescing latency values for computing systems that use multiple data queues having a shared base timer. A computing system having at least one receive queue and at least one transmit queue receives user-provided coalescing latency values for the respective queues, and converts these user-provided latencies to coalescing latency hardware register values as well as a base timer register value for the shared base timer. The hardware register values for the coalescing latencies together with the shared base timer register value determine the coalescing latencies for the respective queues. This mapping technique allows a user to conveniently set coalescing latencies for multi-queue processing systems while shielding the user settings from hardware complexity.

21 Claims, 5 Drawing Sheets

MULTIPLE-QUEUE INTEGER COALESCING MAPPING ALGORITHM WITH SHARED BASED TIME

TECHNICAL FIELD

The subject disclosure relates generally to electrical design, and, for example, to techniques for setting coalescing latencies for computing systems having multiple data queues and a base timer that is shared between the data queues.

BACKGROUND

Many computing systems, including but not limited to system-on-chips (SoCs) or other very-large-scale integration (VLSI) systems, implement queue-based processing of data packets and/or computing tasks. According to this technique, data packets or tasks generated by an application executed by the computing system are placed in one or more receive queues for processing by the computing system's central processing unit (CPU). The CPU processes the data packets or tasks for each receive queue in the order in which the packets were placed in the queue, and sends processed output data packets (e.g., processing results, acknowledgements, etc.) to one or more transmit queues for delivery to other system components (e.g., peripherals, output devices, storage locations in memory, etc.).

When new data is to be processed, computing systems typically generate an interrupt signal informing the CPU that new data is present in the receive queue and instructing the CPU to process this new data. The CPU responds to such interrupt signals by temporarily suspending one or more current processing activities in order to process the queued data.

In some scenarios, an interrupt signal is generated each time a new data packet or task is added to a receive queue. Since this approach can result in a large number of CPU interrupts, potentially degrading performance, some systems support interrupt coalescing, whereby the system delays generation of the interrupt signal upon receipt of a new data packet, allowing multiple data packets to accumulate in the receive queue before generating the interrupt. When the interrupt signal is generated in this scenario, the CPU processes multiple queued data packets during the same interrupt rather than processing only a single data packet per interrupt.

The above-described description is merely intended to provide a contextual overview of current techniques and is not intended to be exhaustive.

SUMMARY

The following presents a simplified summary in order to provide a basic understanding of some aspects described herein. This summary is not an extensive overview of the disclosed subject matter. It is intended to neither identify key nor critical elements of the disclosure nor delineate the scope thereof. Its sole purpose is to present some concepts in a simplified form as a prelude to the more detailed description that is presented later.

In one or more embodiments, an integrated circuit chip is provided, comprising a processing component configured to process data received via at least one receive queue of multiple data queues and to send processed data to at least one transmit queue of the multiple data queues, wherein respective coalescing latencies associated with the multiple data queues are set based on coalescing latency register values respectively associated with the multiple data queues and a base timer register value that is shared by the multiple data queues; a user interface component configured to receive input data representing at least one user-defined coalescing latency for at least one queue of the multiple data queues; and a mapping component configured to set the coalescing latency register values for the multiple data queues and the base timer register value based on the input data, and write the coalescing latency register values and the base timer register value to respective hardware registers.

Also, a method for setting coalescing latencies is provided, comprising receiving, by a system comprising a processor, input data representing at least one user-defined coalescing latency for at least one data queue of multiple data queues, wherein the processor is configured to process data received via at least a first of the multiple data queues and to send processed data to at least a second of the multiple data queues; generating, by the system based on the input data, coalescing latency register values respectively corresponding to the multiple data queues and a base timer register value that is common to the multiple data queues, wherein coalescing latencies respectively associated with the multiple data queues are set based on the coalescing latency register values respectively associated with the multiple data queues and the base timer register value; and writing, by the system, the coalescing latency register values and the base timer register value to respective hardware registers of the system.

In addition, system-on-chip is provided, comprising a central processing unit configured to process data received via at least one receive queue of multiple data queues and to send processed data to at least one transmit queue of the multiple data queues; a base timer register configured to store a base timer value that is shared by the multiple data queues; coalescing latency registers configured to store respective coalescing latency values associated with the multiple data queues, wherein respective coalescing latencies for the multiple data queues are set based on the base timer value and the coalescing latency values; a user interface component configured to receive input data defining user-defined coalescing latency values $x_i$ for the multiple data queues, where $i=0$ through ($Q_{max}-1$), and where $Q_{max}$ is a number of the multiple data queues; and a mapping component configured to determine a maximum user-defined coalescing latency value $x_{i\_max}$ among the user-defined coalescing latency values $x_i$, set a coalescing latency value $t_{i\_max}$ for one of the multiple data queues corresponding to the maximum user-defined coalescing latency value $x_{i\_max}$ equal to a defined maximum coalescing latency register value $T_{max}$, for respective ith coalescing latency register values $t_i$ other than coalescing latency value $t_{i\_max}$, set $t_i$ based on a ratio of $x_i$ to $x_{i\_max}$, set the base timer value b based on $x_{i\_max}$, write the coalescing latency values $t_i$ to the coalescing latency registers, and write the base timer value b to the base timer register.

The following description and the annexed drawings set forth in detail certain illustrative aspects of the subject disclosure. These aspects are indicative, however, of but a few of the various ways in which the principles of various disclosed aspects can be employed and the disclosure is intended to include all such aspects and their equivalents. Other advantages and novel features will become apparent from the following detailed description when considered in conjunction with the drawings.

DETAILED DESCRIPTION

Figure 1:
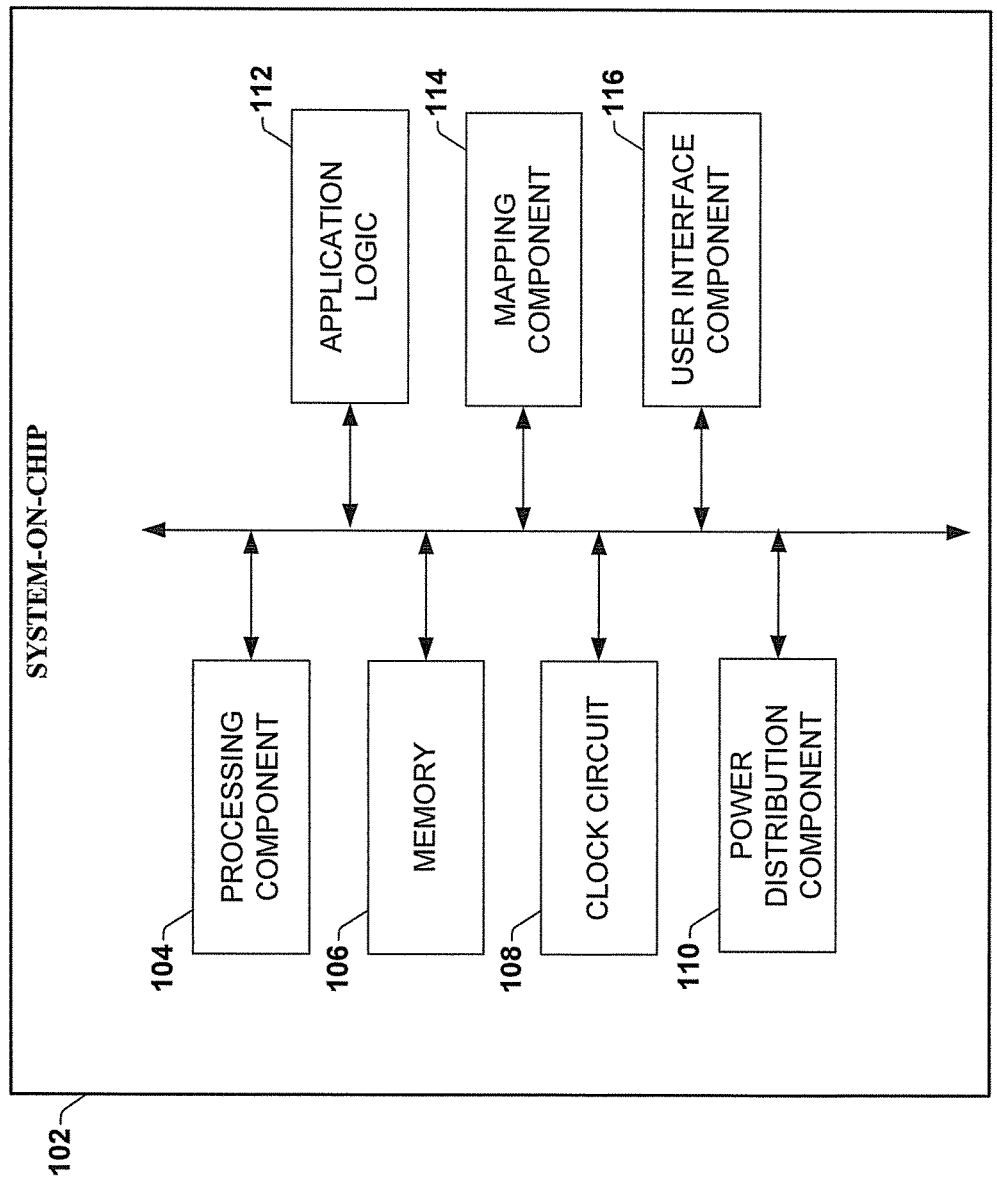
FIG. 1 is a block diagram of an example, non-limiting system-on-chip (SoC).

The disclosure herein is described with reference to the drawings, wherein like reference numerals are used to refer to like elements throughout. In the following description, for purposes of explanation, numerous specific details are set forth in order to provide a thorough understanding of the subject innovation. It may be evident, however, that various disclosed aspects can be practiced without these specific details. In other instances, well-known structures and devices are shown in block diagram form in order to facilitate describing the subject innovation.

As noted above, many computing systems support interrupt coalescing, whereby CPU interrupts are delayed in order to reduce the total number of interrupts sent to the CPU. While interrupt coalescing can reduce the interrupt load on the CPU, postponing the interrupt signal in this manner can introduce additional processing latencies, since some data packets must wait in the receive queue longer before being processed. Given this trade-off between minimizing the number of CPU interrupts and timely processing of data, some computing systems may allow the user to modify the interrupt coalescing settings in order to tune performance.

One or more embodiments described herein provide a system and method for mapping user-provided coalescing latency values to hardware registers associated with data queues that share a common base timer. In one or more embodiments, a mapping component is provided in a system that employs multiple data queues that share a common base timer, where the base timer controls the coalescing latencies for the queues based on defined coalescing latency values associated with each queue. Some such systems may include only two queues—a receive queue and a transmit queue. Other such systems may include multiple transmit and receive queues. In either scenario, the mapping component can receive user-defined integer values representing coalescing latencies for the respective queues. Based on these user-defined values, the mapping component generates a hardware register value for the shared base timer, as well as hardware register values representing coalescing latencies for each queue, and writes these values to the appropriate hardware registers. Together, the base time register value and each coalescing latency register value defines the coalescing latencies for the respective queues. The hardware register values generated by the mapping component can yield coalescing latencies for the multiple queues with a balanced approximation.

The techniques described herein can allow users to configure network coalescing latencies efficiently, while shielding the user settings from hardware complexity. For SoCs that employ only two queues—a receive queue and a transmit queue—the user need only assign one integer number for the receive queue and one integer number for the transmit queue. The mapping component will then convert these two numbers to the three values required by some systems in which the data queues share a common base timer. If the user wishes to change only one of the two integer values, the mapping component will recalculate all three register values based on the modified value provided by the user as well as the previously provided, unchanged value of the other integer. Thus, the mapping features described herein can be used to tune network performance on systems that support network coalescing and which use a shared based timer among data queues.

FIG. 1 is a block diagram of an example, non-limiting system-on-chip (SoC) 102 according to one or more embodiments of this disclosure. Although FIG. 1 depicts certain functional components as being implemented on SoC 102, it is to be appreciated that one or more of the functional components illustrated in FIG. 1 may be implemented within the context of other types of computing systems, including but not limited to computer operating system hardware and/or software, other types of VLSIs or integrated circuits, or other computing systems that employ queue-based data processing. Aspects of the systems, apparatuses, or processes explained in this disclosure can constitute machine-executable components embodied within machine(s), e.g., embodied in one or more computer-readable mediums (or media) associated with one or more machines. Such components, when executed by one or more machines, e.g., computer(s), computing device(s), automation device(s), virtual machine(s), etc., can cause the machine(s) to perform the operations described.

Example SoC 102 can include a processing component 104, memory 106, a clock circuit 108, a power distribution component 110, application logic 112, a mapping component 114, and a user interface component 116. Processing component 104 can comprise, for example, an integrated CPU, microprocessor, or microcontroller. Memory 106 can comprise one or both of read-only memory (ROM) or random access memory (RAM), and may store such information as hardware register values, data queue information (e.g., the contents of receive and transmit data queues), temporary data values generated in connection with executing application logic 112 and other system functions, or other such data.

Clock circuit 108 can be configured to generate clock pulses that are used by the system to synchronize operations of the SoC. Power distribution component 110 can be configured to distribute supply voltage to components of the SoC. Application logic 112 can comprise software and/or hardware instructions that, when executed by the processing component 104 in association with other system components, cause the SoC to carry out one or more defined functions. Application logic 112 can be configured to implement one or more general-purpose or special-purpose functions.

Mapping component 114 can be configured to receive user-defined coalescing latency integer values and, based on these values, generate hardware register values representing coalescing latencies for individual data queues as well as a hardware register value to be associated with the base timer shared by the queues. For certain systems that employ a shared base timer between multiple data queues, these hardware register values define the coalescing latencies for the respective queues.

User interface component 116 can be configured to receive input data from a user input device or peripheral (e.g., a keyboard, a mouse, a touchscreen, etc.), and to send output data to a user output device (e.g., a display device). Input data received via the user interface component 116 can include, for example, integer values for receive queue and transmit queue latencies.

Figure 2:
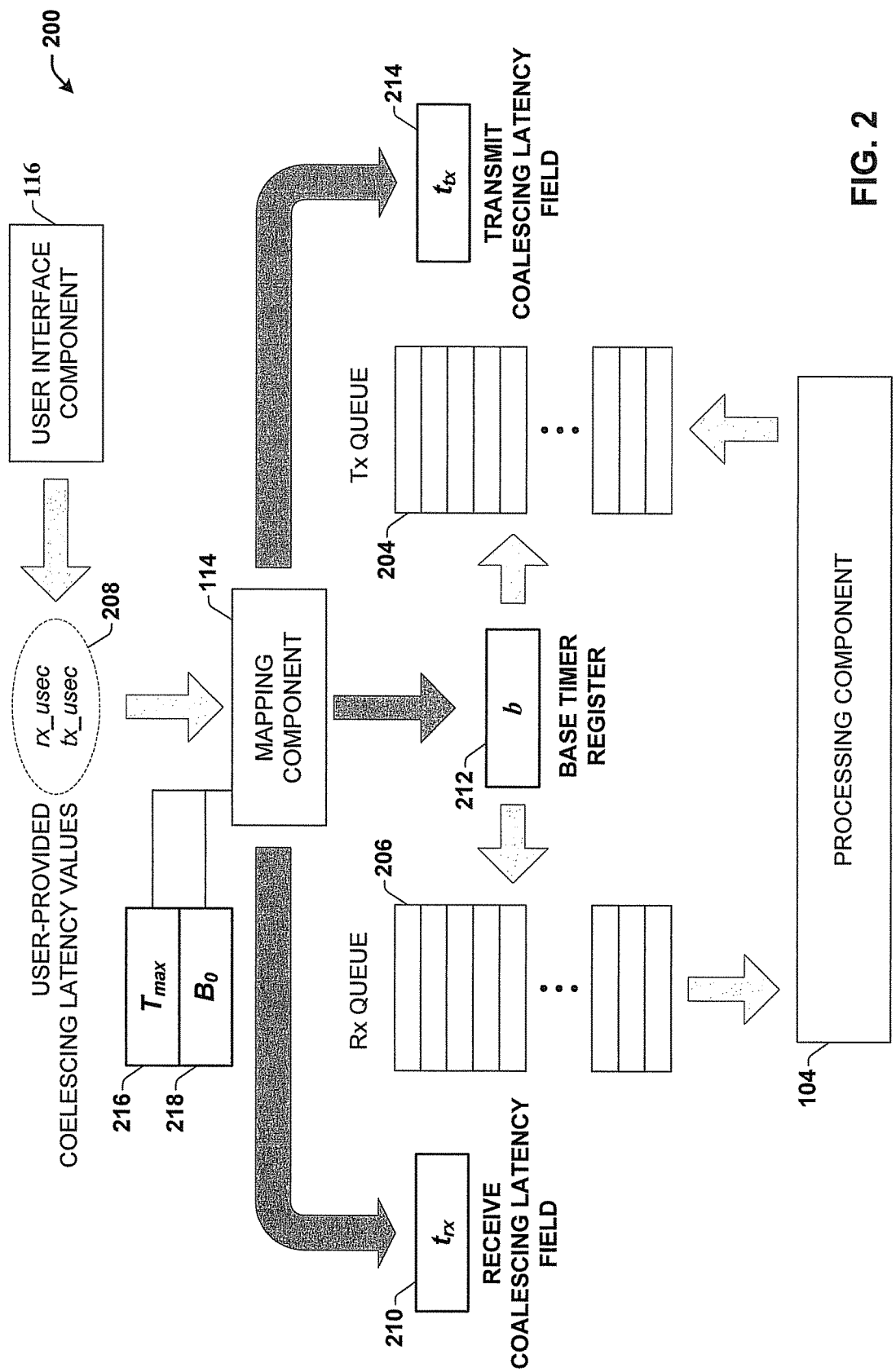
FIG. 2 is a diagram of an example two-queue system that includes a mapping component configured to map user-provided coalescing latency values to hardware register values for the two queues and a shared base timer.

FIG. 2 is a diagram of an example two-queue system 200 that includes a mapping component 114 configured to map user-provided coalescing latency values 208 to hardware register values for the two queues and a shared base timer. System 200 can be an integrated component of an SoC or other type of computing system that carries out queue-based processing. In this example system, processing component 104 (e.g., a CPU, a microcontroller, etc.) receives data via a receive (Rx) queue 206 for processing, and sends processed data to a transmit (Tx) queue 204. Data flow through the Rx and Tx queues are controlled in part by a shared base timer value b stored in a base timer register 212. Additionally, the Rx queue 206 and Tx queue 204 have associated coalescing latency integers—$t_{rx}$ and $t_{tx}$, respectively—stored in corresponding registers, or in respective fields of a single register. In some scenarios, $t_{rx}$ and $t_{tx}$ may be stored in respective fields 210 and 214 of a hardware register referred herein to as a ctick register.

Base time value b is an unsigned integer stored in register 212 and having a value $0 < b \leq B_{max}$, where $B_{max}$ is the maximum value of the base timer as defined in a system hardware register. In an example embodiment, $B_{max}$ may be 65535 (16 bits).

Register value $t_{rx}$ is an unsigned integer value (e.g., stored in field 210 of the ctick register) for the Rx queue having a value of $0 \leq t_{rx} \leq T_{max}$, where $T_{max}$ is a pre-defined constant representing the maximum number supported by the system hardware for a queue. In an example embodiment, $T_{max}$ may be 7 (3 bits).

Register value $t_{tx}$ is an unsigned integer value (e.g., stored in field 214 of the ctick register) for the Tx queue having a value of $0 \leq t_{tx} \leq T_{max}$.

In accordance with the hardware architecture of system 200, the coalescing latency for the Rx queue is:

$$Rx \text{ coalescing latency} = (b+1) * t_{rx} * clk\_cycle \quad (1)$$

and the coalescing latency for the Tx queue is:

$$Tx \text{ coalescing latency} = (b+1) * t_{tx} * clk\_cycle \quad (2)$$

Where clk_cycle is a cycle of the system clock as determined by clock circuit 108 (see FIG. 1).

Since register value b for the base timer 202 is typically much larger than 1, equations (1) and (2) can be simplified to:

$$Rx \text{ coalescing latency} = b * t_{rx} * clk\_cycle \quad (3)$$

$$Tx \text{ coalescing latency} = b * t_{tx} * clk\_cycle \quad (4)$$

As can be seen by equations (3) and (4), the coalescing latencies for the Rx and Tx queues are a function of base timer register value b (which is shared by both queues) and the coalescing integers $t_{rx}$ and $t_{tx}$ for the respective queues.

To allow a user to tune the system's coalescing settings, user interface component 116 allows the user to enter two user-assigned coalescing latency values 208. In some embodiments, these values may be provided to the system using Linux ethnet tool. In such embodiments, using Linux ethtool terminology, these coalescing latency values are labeled rx_usec (for the Rx queue) and tx_usec (for the Tx queue). It is to be appreciated, however, that the mapping techniques described herein are not limited to use with Linux systems, but rather are also suitable for use in other operating, networking, or computing systems. Although, for the two-queue system described herein in connection with FIG. 2, the two user-provided coalescing latency values 208 are referred to herein using Linux ethtool terminology rx_usec and tx_usec, this is not to be construed as limiting the system to use with Linux systems. In some embodiments, rx_usec and tx_usec can be unsigned integers representing desired coalescing latency settings for the Rx and Tx queues, respectively.

Some computing systems that do not employ a shared base timer between multiple queues directly map the two user-provided integer values of rx_usec and tx_usec to corresponding hardware registers, or generate the register values by multiplying or dividing the user-provided integer values by a pre-defined scaling factor prior to writing the scaled values to the corresponding registers. However, these techniques are not suitable for the system 200 depicted in FIG. 2, in which the Rx and Tx queues share a common base timer, and which uses three hardware register values—b, $t_{rx}$, and $t_{tx}$—to set the coalescing latencies for the Rx and Tx queues, as described above (see equations (3) and (4)). To address this issue, mapping component 114 is configured to convert user-provided latency values rx_usec and tx_usec to values of b, $t_x$, and $t_{tx}$, thereby setting the coalescing latencies for the Rx and Tx queues for system 200.

The algorithm implemented by mapping component 114 is now described for the two-queue system illustrated in FIG. 2. As will be described in more detail below, the mapping technique can be generalized for other multi-queue systems that use more than two queues.

In general, mapping component 114 converts user-provided values of rx_usec and tx_usec to hardware register values b, $t_{rx}$, and $t_{tx}$ in accordance with the following general algorithm:

1. If both tx_usec and tx_usec are 0 (indicating that coalescing is to be disabled), both $t_{rx}$ and $t_{tx}$ will be set to 0, and b will be set equal to $B_0$, where $B_0$ is a pre-defined integer number. In some embodiments, $B_0$ may be equivalent to the clock count in coalescing hardware corresponding to approximately 1 microsecond or another duration assigned by a driver designer. $B_0$ may be specific to the SoC on which the system is implemented. As will be demonstrated below, the size of the coalescing latency tuning steps is partly a function of the value of $B_0$.

2. Else, if tx_usec>tx_usec, $t_{rx}$ will be set equal to $T_{max}$ (a pre-defined constant representing the maximum number for a queue, as described above).

3. Else, $t_{tx}$ will be set equal to $T_{max}$.

The values of $B_0$ and $T_{max}$ are pre-defined constants stored in components 216 and 218, respectively. In some embodiments, these constants can be stored in memory as part of the driver program.

Figure 3:
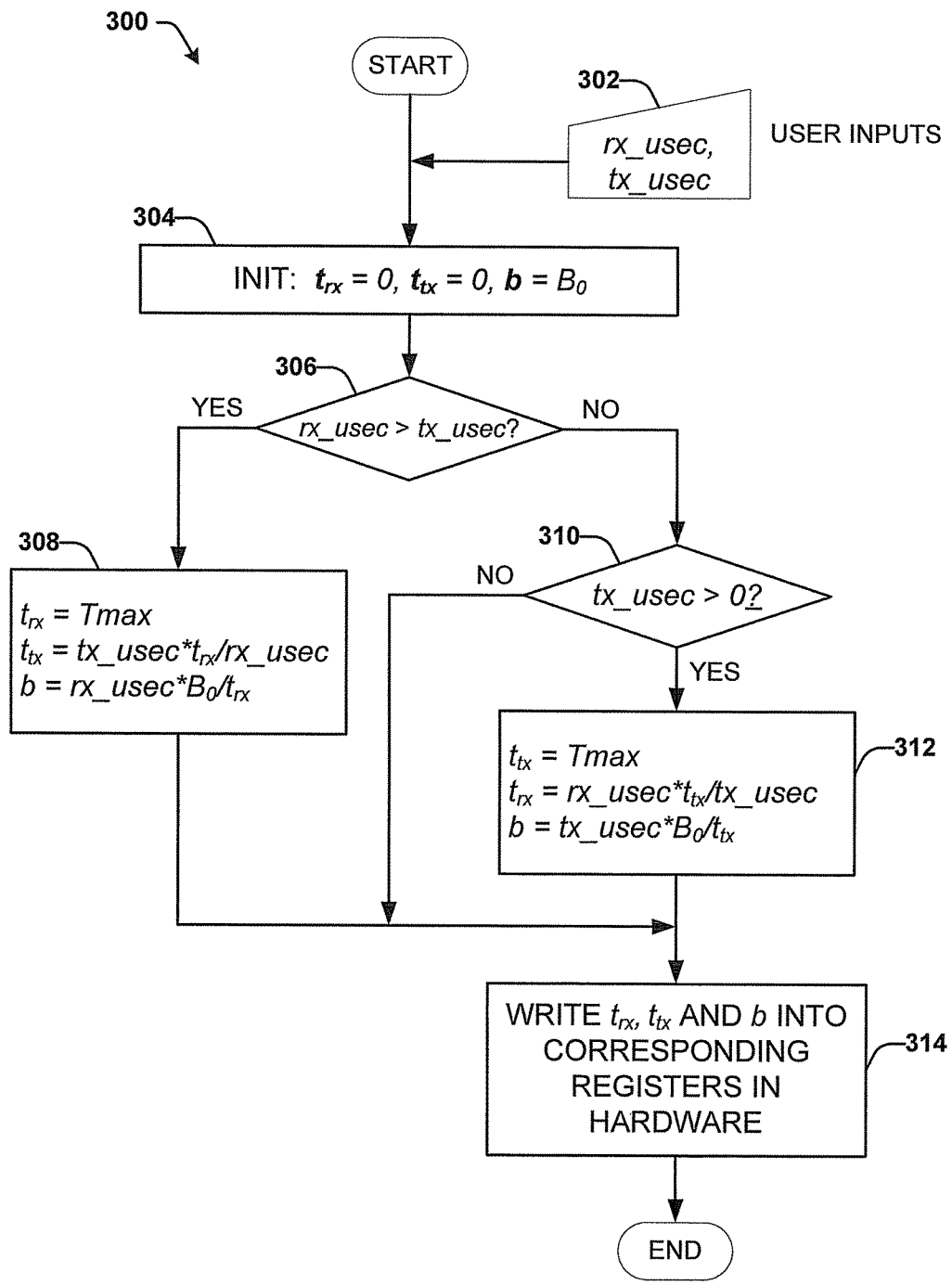
FIG. 3 is a flowchart of an example methodology for converting user-defined latency values rx_usec and tx_usec for a two-queue system to values of b, $t_{rx}$, and $t_{tx}$, which can be written to their corresponding registers in a two-queue system to set the coalescing latencies for receive and transmit queues.

FIG. 3 is a flowchart of an example methodology 300 for converting the user-defined latency values rx_usec and tx_usec for a two-queue system to values of b, $t_{rx}$, and $t_{tx}$, which can be written to their corresponding hardware registers in system 200 to set the coalescing latencies for the Rx and Tx queues. Methodology 300 can be implemented, for example, by mapping component 114 of FIGS. 1 and 2.

Initially, at 302, coalescing latency values rx_usec and tx_usec are entered by a user (e.g., via user interface component 116). For embodiments in which the system is implemented on a Linux system, rx_usec and tx_usec may be entered using Linux's ethtool. However, methodology 300 is not limited to use with Linux operating systems, but rather may be implemented as components of other types of operating systems, networking systems, or SoCs. In general, values of tx_usec and tx_usec may be entered by the user using any suitable input tool or mechanism native to the operating context in which methodology 300 is implemented.

At 304, values of b, $t_{rx}$, and $t_{tx}$ are initialized. Specifically, $t_{rx}$ and $t_{tx}$ are initialized to 0, while b is initialized to $B_0$. At 306, a determination is made regarding whether rx_usec is greater than tx_usec. If rx_usec is greater than tx_usec (YES at step 306), the methodology moves to step 308, where b, $t_x$, and G are set as follows:

$$t_{rx} = T_{max} \quad (5)$$

$$t_{tx} = tx\_usec * t_{rx}/rx\_usec \quad (6)$$

$$b = rx\_usec * B_0/t_x \quad (7)$$

Alternatively, if rx_usec is not greater than tx_usec (NO at step 306), the methodology moves to step 310, where a determination is made regarding whether tx_usec is greater than zero. If tx_usec is greater than zero (YES at step 310), the methodology moves to step 312, where b, $t_{rx}$, and $t_{tx}$ are set as follows:

$$t_{tx} = T_{max} \quad (8)$$

$$t_{rx} = rx\_usec * t_{tx}/tx\_usec \quad (9)$$

$$b = tx\_usec * B_0/t_{tx} \quad (10)$$

Alternatively, if tx_usec is not greater than zero (NO at step 310), the methodology moves to step 314 without modifying b, $t_{rx}$, and $t_{tx}$ from their initialized values.

After b, $t_{rx}$, and $t_{tx}$ have been set by either step 308 or 312, or have had their initial values left intact after determining that rx_usec and tx_usec are zero, the methodology moves to step 314, where the values of b, $t_{rx}$, and $t_{tx}$ are written to their appropriate registers (e.g., registers and/or fields 210, 212, and 214 of FIG. 2), thereby setting the coalescing latencies for the Rx and Tx queues in accordance with equations (3) and (4).

As can be seen in equation (10), since the value of the base timer b is partly a function of pre-defined integer $B_0$ (which defines a number of clock counts corresponding to a specified time duration), the coalescing latency tuning steps are also partly a function of $B_0$. As such, the value of $B_0$ can be selected by the system designer to be small enough to facilitate fine adjustments of the coalescing latencies, while also being large enough to cover larger coalescing latencies which may be needed by some applications.

Methodology 300 implements the following general rules for converting user-provided latency values tx_usec and tx_usec to values of b, $t_{rx}$, and $t_{tx}$ suitable for system 200:

1. When rx_usec or tx_usec is zero, the corresponding value of $t_{rx}$ or $t_{tx}$ will be set to zero, which disables coalescing in the corresponding queue.

2. When either tx_usec or tx_usec is greater than zero, the larger of the two will set the corresponding t (either $t_{rx}$ or $t_{tx}$) to $T_{max}$. The smaller of the two will be calculated approximately based on the ratio of the smaller input value to the larger input value, such that, in an example scenario in which tx_usec is the larger user-provided value:

$$tx\_usec/tx\_usec = t_{rx}/t_{tx}, \text{ if } tx\_usec > 0 \quad (11)$$

3. When both $t_{rx}$ and $t_{tx}$ are zero, b can be set equal to $B_0$. However, since coalescing in both the Rx and Tx queues are disabled in this scenario, the value of b does not matter with regard to the hardware functionality.

4. When either $t_{rx}$ or $t_{tx}$ is greater than zero, b will be calculated in a way that makes the following equation hold:

$$t_{max} * b = x_{max} * B_0 \quad (12)$$

Where $t_{max}$ is the larger one of $t_{rx}$ or $t_{tx}$, and $x_{max}$ is the larger one of rx_usec or tx_usec. Taking equation (11) into consideration yields:

$$rx\_usec * B_0 = t_{rx} * b \quad (13)$$

$$tx\_usec * B_0 = t_{tx} * b \quad (14)$$

Equations (13) and (14) show the conversion from user inputs to hardware register values for system 200 is correspondingly mapped.

Figure 4:
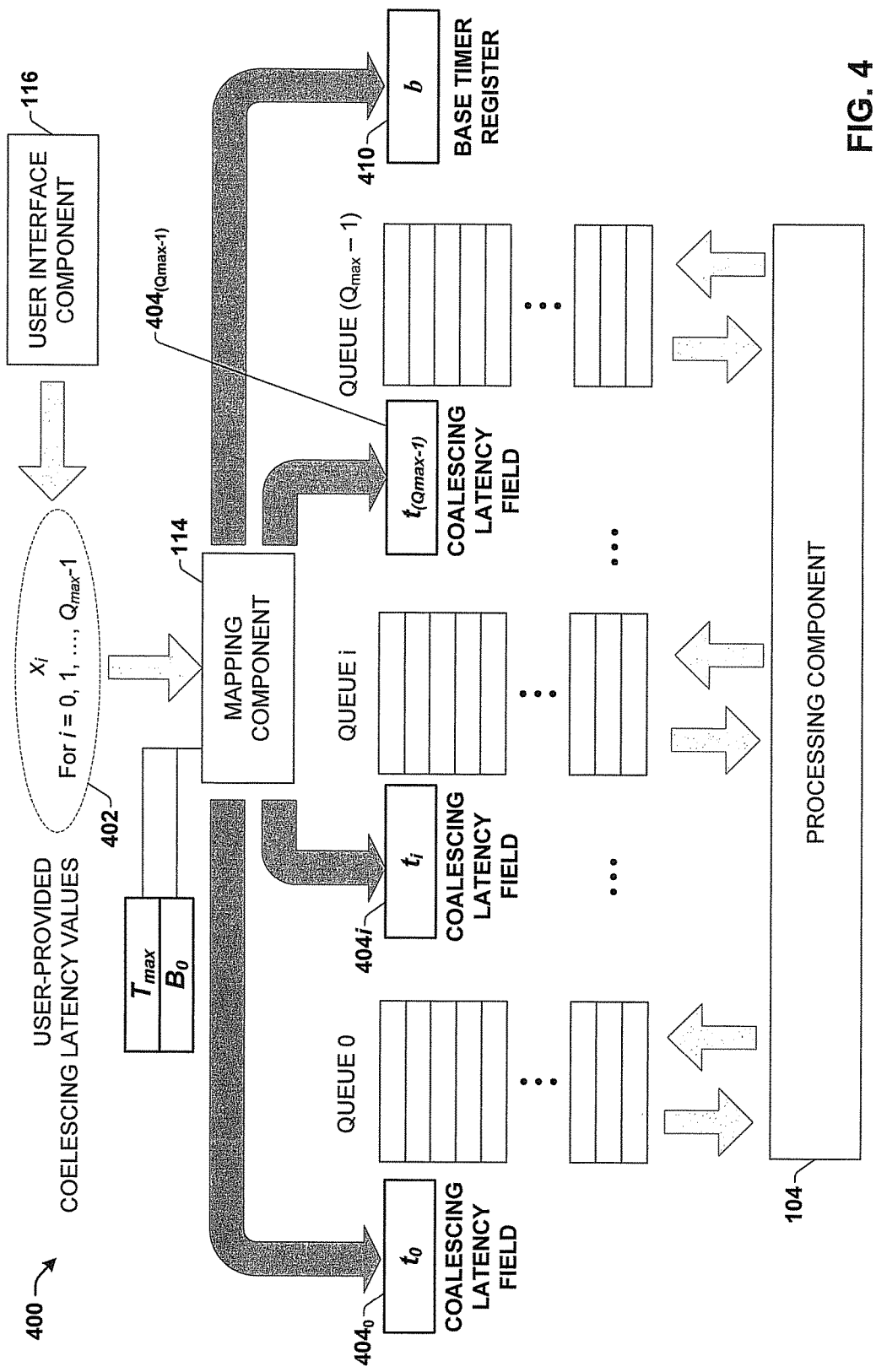
FIG. 4 is a diagram of an example multi-queue system that includes a mapping component configured to map user-provided coalescing latency values to hardware register values for the multiple queues and a shared base timer.

Methodology 300 describes conversion of user-provided coalescing latency values for a two-queue system, such as system 200 depicted in FIG. 2. As noted above, this mapping technique can be generalized for systems comprising more than two queues, where each queue can be assigned its own user-provided coalescing latency. FIG. 4 is a diagram of an example multi-queue system 400 that includes a mapping component 114 configured to map user-provided coalescing latency values 402 to hardware register values for the multiple queues and a shared base timer. Similar to system 200, multi-queue system 400 can be an integrated component of an SoC or other type of VLSI or computing system that supports queue-based processing. In this example system, processing component 104 (e.g., a CPU, a microcontroller, etc.) receives data from multiple Rx queues, and sends processed data to multiple Tx queues. Example system 400 employs a total of $Q_{max}$ queues, where $Q_{max}$ is an integer. In FIG. 4 and the associated description below, the queues are labeled Queue 0 through Queue ($Q_{max}$−1), and a given queue within this range of queues is referred to generically as Queue i, where $0 \le i \le Q_{max} - 1$.

Although not delineated in FIG. 4, it is to be understood that a subset of queues 0 through ($Q_{max}$−1) are Rx queues, while the remaining subset of the queues are Tx queues. As in the two-queue case described above in connection with FIGS. 2 and 3, each queue has an associated register or register field 404 for storing a coalescing latency value $t_i$ assigned to that queue. In this multi-queue case, $t_i$ is analogous to $t_{rx}$ and $t_{tx}$ in the two-queue case, and comprises an unsigned integer value representing a coalescing latency for a generic queue Queue i (for i=0, 1, . . . , $Q_{max}$−1). $T_{max}$ is a pre-defined constant representing the maximum number supported by the system hardware for a queue, such that $0 \le t_i \le T_{max}$.

Also similar to the two-queue case, a shared base timer value b is stored in a base timer register 410. For a given Queue i of the set of queues, the coalescing latency is characterized by:

$$\text{coalescing latency} = b * t_i * clk\_cycle \quad (15)$$

which is a generalization of the two-queue equations (3) and (4) for systems having more than two queues.

The conversion features performed by mapping component 114 described above or the two-queue case can be generalized for systems having more than two queues (e.g., $Q_{max}$ queues). For system 400, the user can enter coalescing values $x_i$ for one or more of the queues, where $x_i$ is an unsigned integer value representing a user-provided coalescing latency for a generic Queue i (i=0, 1, ..., $Q_{max}$−1). Mapping component 114 converts these user-provided coalescing values $x_i$ to values for $t_i$ (for i=0, 1, ..., $Q_{max}$−1) and base timer value b according to the following general protocol:

1. When $x_1$ is zero, $t_1$ will become zero, and thus coalescing in the corresponding ith queue will be disabled.

2. $x_{i\_max}$, which is the maximum value among all $x_i$ received from the user, is used to calculate $t_{i\_max}$ and base timer value b, where $t_{i\_max}$ is a maximum value assigned among all $t_1$. This yields a reasonable accuracy for the coalescing latency register values. Once $t_{i\_max}$ is determined, all other hardware coalescing values $t_1$ will be calculated based on $x_i$, $x_{i\_max}$, and $t_{i\_max}$ such that the following ratio is satisfied:

$$\frac{x_i}{x_{i\_max}} = \frac{t_i}{t_{i\_max}} \qquad (16)$$

3. If all user-provide latency values $x_i$ are 0, base timer value b will be set to $B_0$, the predefined integer number set in the SoC corresponding to a defined clock duration (e.g., 1 microsecond).

4. If $x_{i\_max}$ is greater than zero, base timer value b is set such that the following equation is satisfied:

$$t_{i\_max} * b = x_{i\_max} * B_0 \qquad (17)$$

Figure 5:
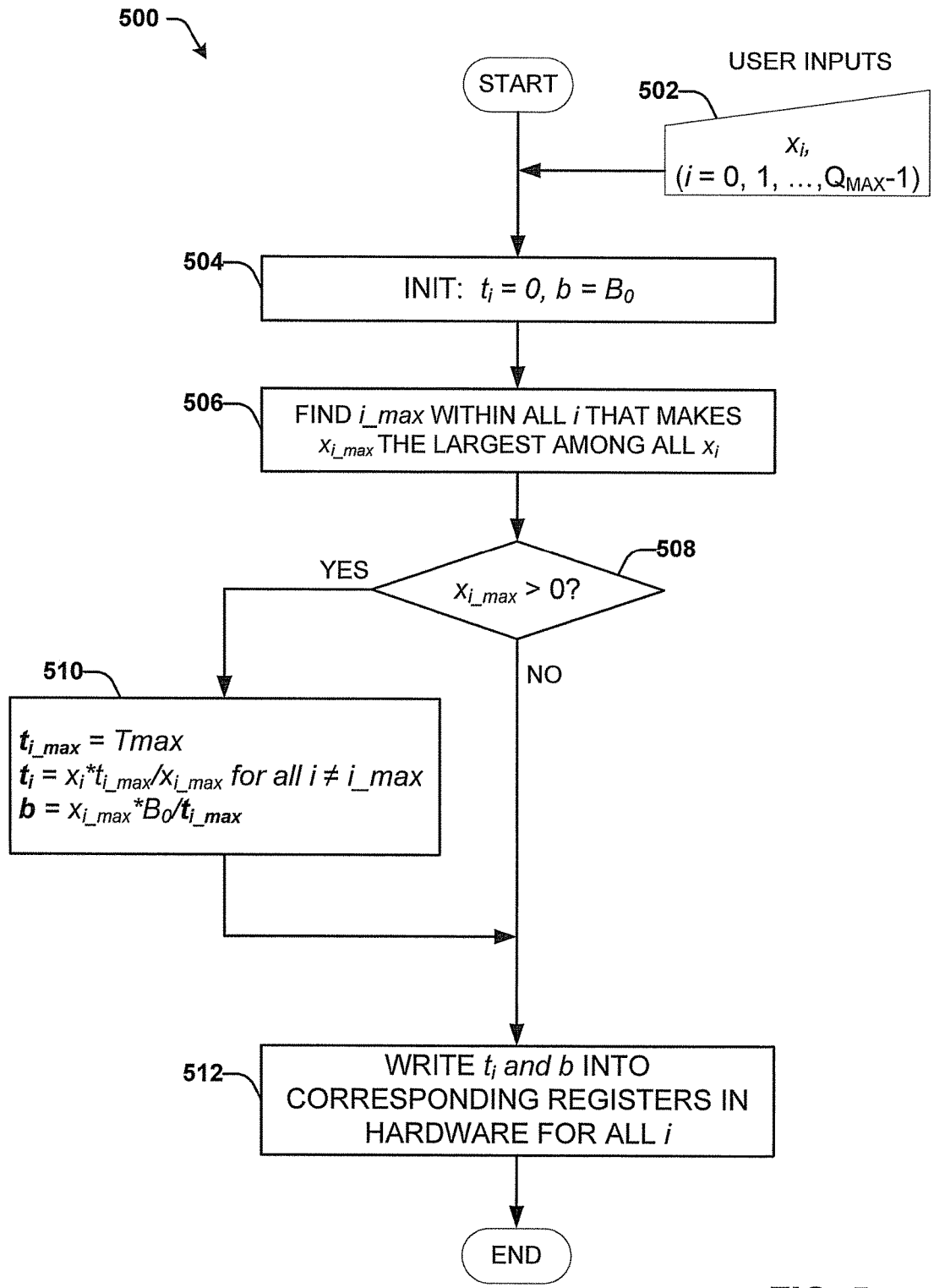
FIG. 5 is a flowchart of an example methodology for converting user-defined latency values $x_i$ for a system comprising $Q_{max}$ queues to values of $t_i$ (for all i) and b, which can be written to their corresponding registers in a multi-queue system to set the coalescing latencies.

FIG. 5 is a flowchart of an example methodology 500 for converting the user-defined latency values $x_i$ for a system comprising $Q_{max}$ queues to values of $t_i$ (for all i=0, 1, ..., $Q_{max}$−1) and b, which can be written to their corresponding registers 404 and 410 in system 400 to set the coalescing latencies for all queues. Methodology 500 can be implemented, for example, by mapping component 114 of FIG. 4.

Initially, at 502, one or more coalescing latency values $x_i$ are entered by a user (e.g., via user interface component 116). Assuming $Q_{max}$ is the total number of queues for which coalescing latencies are to be assigned, the system allows the user to enter values of $x_i$ for any i=0, 1, ..., $Q_{max}$−1. For embodiments in which the system is implemented on a Linux system, values of $x_i$ may be entered using Linux's ethtool. However, methodology 500 is not limited to use with Linux operating systems, but rather may be implemented as components of other types of operating systems, networking systems, or SoCs. In general, values of $x_i$ may be entered by the user using any suitable input tool or mechanism native to the computing context in which methodology 500 is implemented.

At 504, hardware coalescing latency values $t_i$ are all initialized to zero, and base timer value b is initialized to $B_0$. At 506, a value of i_max is found within all values of i that makes $x_{i\_max}$ the largest among all $x_i$. That is, the largest user-provided coalescing latency value $x_i$, referred to as $x_{i\_max}$, is determined.

At 508, a determination is made regarding whether $x_{i\_max}$ is greater than zero. If $x_{i\_max}$ is not greater than zero (NO at step 508), indicating that all values of $x_i$ are zero, the methodology moves to step 512, where the initialized values of $t_i$ and b are written to their corresponding registers in hardware for all i.

Alternatively, if $x_{i\_max}$ is greater than zero (YES at step 508), the methodology moves to step 510, where the values of $t_i$ (for all 0 and b are set as follows:

$$t_{i\_max} = T_{max} \qquad (18)$$

$$t_i = x_i * t_{i\_max} / x_{i\_max}, \text{ for all } i \ne i\_max \qquad (19)$$

$$b = x_{i\_max} * B_0 / t_{i\_max} \qquad (20)$$

Once the values of $t_i$ and b have been set according to equations (18)-(20), the values of $t_i$ and b are written to their corresponding registers in hardware for all i at step 512 and the methodology ends.

The mapping techniques described above allow users to configure network coalescing latencies for multi-queue systems that use a shared base timer, while shielding the user settings from hardware complexity associated with such systems. The system allows the user to enter coalescing latency values for respective data queues, and converts these values to accurate hardware register values used by such multi-queue systems to set the coalescing latencies.

Reference throughout this specification to "one embodiment," "an embodiment," "an example," "a disclosed aspect," or "an aspect" means that a particular feature, structure, or characteristic described in connection with the embodiment or aspect is included in at least one embodiment or aspect of the present disclosure. Thus, the appearances of the phrase "in one embodiment," "in one aspect," or "in an embodiment," in various places throughout this specification are not necessarily all referring to the same embodiment. Furthermore, the particular features, structures, or characteristics may be combined in any suitable manner in various disclosed embodiments.

As utilized herein, terms "component," "system," "engine," "architecture" and the like are intended to refer to a computer or electronic-related entity, either hardware, a combination of hardware and software, software (e.g., in execution), or firmware. For example, a component can be one or more transistors, a memory cell, an arrangement of transistors or memory cells, a gate array, a programmable gate array, an application specific integrated circuit, a controller, a processor, a process running on the processor, an object, executable, program or application accessing or interfacing with semiconductor memory, a computer, or the like, or a suitable combination thereof. The component can include erasable programming (e.g., process instructions at least in part stored in erasable memory) or hard programming (e.g., process instructions burned into non-erasable memory at manufacture).

By way of illustration, both a process executed from memory and the processor can be a component. As another example, an architecture can include an arrangement of electronic hardware (e.g., parallel or serial transistors), processing instructions and a processor, which implement the processing instructions in a manner suitable to the arrangement of electronic hardware. In addition, an architecture can include a single component (e.g., a transistor, a gate array, ...) or an arrangement of components (e.g., a series or parallel arrangement of transistors, a gate array connected with program circuitry, power leads, electrical ground, input signal lines and output signal lines, and so on). A system can include one or more components as well as one or more architectures. One example system can include a switching block architecture comprising crossed input/output lines and pass gate transistors, as well as power source(s), signal generator(s), communication bus(ses), controllers, I/O interface, address registers, and so on. It is to be appreciated that some overlap in definitions is anticipated, and an architecture or a system can be a stand-alone component, or a component of another architecture, system, etc.

In addition to the foregoing, the disclosed subject matter can be implemented as a method, apparatus, or article of manufacture using typical manufacturing, programming or engineering techniques to produce hardware, firmware, software, or any suitable combination thereof to control an electronic device to implement the disclosed subject matter. The terms "apparatus" and "article of manufacture" where used herein are intended to encompass an electronic device, a semiconductor device, a computer, or a computer program accessible from any computer-readable device, carrier, or media. Computer-readable media can include hardware media, or software media. In addition, the media can include non-transitory media, or transport media. In one example, non-transitory media can include computer readable hardware media. Specific examples of computer readable hardware media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Computer-readable transport media can include carrier waves, or the like. Of course, those skilled in the art will recognize many modifications can be made to this configuration without departing from the scope or spirit of the disclosed subject matter.

What has been described above includes examples of the subject innovation. It is, of course, not possible to describe every conceivable combination of components or methodologies for purposes of describing the subject innovation, but one of ordinary skill in the art can recognize that many further combinations and permutations of the subject innovation are possible. Accordingly, the disclosed subject matter is intended to embrace all such alterations, modifications and variations that fall within the spirit and scope of the disclosure. Furthermore, to the extent that a term "includes", "including", "has" or "having" and variants thereof is used in either the detailed description or the claims, such term is intended to be inclusive in a manner similar to the term "comprising" as "comprising" is interpreted when employed as a transitional word in a claim.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. "Approximately" means "about" or two values are close enough to achieve a desired function without the need for exact equivalence. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Additionally, some portions of the detailed description have been presented in terms of algorithms or process operations on data bits within electronic memory. These process descriptions or representations are mechanisms employed by those cognizant in the art to effectively convey the substance of their work to others equally skilled. A process is here, generally, conceived to be a self-consistent sequence of acts leading to a desired result. The acts are those requiring physical manipulations of physical quantities. Typically, though not necessarily, these quantities take the form of electrical and/or magnetic signals capable of being stored, transferred, combined, compared, and/or otherwise manipulated.

It has proven convenient, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise or apparent from the foregoing discussion, it is appreciated that throughout the disclosed subject matter, discussions utilizing terms such as processing, computing, calculating, determining, or displaying, and the like, refer to the action and processes of processing systems, and/or similar consumer or industrial electronic devices or machines, that manipulate or transform data represented as physical (electrical and/or electronic) quantities within the registers or memories of the electronic device(s), into other data similarly represented as physical quantities within the machine and/or computer system memories or registers or other such information storage, transmission and/or display devices.

In regard to the various functions performed by the above described components, architectures, circuits, processes and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the embodiments. In addition, while a particular feature may have been disclosed with respect to only one of several implementations, such feature may be combined with one or more other features of the other implementations as may be desired and advantageous for any given or particular application. It will also be recognized that the embodiments include a system as well as a computer-readable medium having computer-executable instructions for performing the acts and/or events of the various processes.

What is claimed is:

1. An integrated circuit chip, comprising:
   a processing component configured to process data received via at least one receive queue of multiple data queues and to send processed data to at least one transmit queue of the multiple data queues, wherein respective coalescing latencies associated with the multiple data queues are set based on coalescing latency register values respectively associated with the multiple data queues and a base timer register value that is shared by the multiple data queues;
   a user interface component configured, to receive input data representing at least one user-defined coalescing latency for at least one queue of the multiple data queues; and
   a mapping component configured to:
   set the coalescing latency register values for the multiple data queues and the base timer register value based on the input data, and write the coalescing latency register values and the base timer register value to respective hardware registers.

2. The integrated circuit chip of claim 1, wherein a coalescing latency for an ith queue of the multiple data queues is equal or approximately equal to $$b*t_i*\text{clk\_cycle},$$

where i is an integer, b is the base timer register value, $t_i$ is an ith coalescing latency register value of the coalescing latency register values, and clk_cycle is a clock cycle of the integrated circuit chip.

3. The integrated circuit chip of claim 2, wherein the multiple data queues comprise one receive queue associated with a coalescing latency hardware value $t_{rx}$ and one transmit queue associated with a coalescing latency register value $t_{tx}$.

4. The integrated circuit chip of claim 3, wherein the input data comprises a user-defined coalescing latency value rx_usec for the receive queue and a user-defined coalescing latency value tx_usec for the transmit queue, and the mapping component is configured to:
  in response to determining that rx_usec is greater than tx_usec:
    set the coalescing latency register value $t_{rx}$ for the receive queue to a defined maximum coalescing latency register value $T_{max}$,
    set the coalescing latency register value $t_{tx}$ for the transmit queue based on a ratio of rx_usec to tx_usec.

5. The integrated circuit chip of claim 4, wherein the mapping component is configured to:
  in response to determining that rx_usec is greater than tx_usec, set the coalescing latency register value $t_{tx}$ for the receive queue according to $$t_{tx}=tx\_usec*t_{rx}/tx\_usec,$$

and in response to determining that tx_usec is greater than rx_usec, set the coalescing latency register value $t_{rx}$ for the receive queue according to $$t_{rx}=rx\_usec*t_{tx}/tx\_usec.$$

6. The integrated circuit chip of claim 4, wherein the mapping component is configured to:
  in response to determining that tx_usec is greater than tx_usec, set the base time register value b according to $$b=rx\_usec*B_0/t_{rx},$$

and in response to determining that tx_usec is greater than tx_usec, set the base time register value b according to $$b=tx\_usec*B_0/t_{tx},$$

where $B_0$ is a defined clock count value.

7. The integrated circuit chip of claim 5, wherein the input data comprises one or more respective user-defined coalescing latency values $x_i$ for the multiple data queues, where i=0 through ($Q_{max}$−1), and where $Q_{max}$ is a number of the multiple data queues, and wherein the mapping component is configured to:
  determine a maximum user-defined coalescing latency value $x_{i\_max}$ among the user-defined coalescing latency values $x_i$,
  set a coalescing latency register value $t_{i\_max}$ for one of the multiple data queues corresponding to the maximum user-defined coalescing latency value $x_{i\_max}$ equal to a defined maximum coalescing latency register value $T_{max}$,
  for respective ith coalescing latency register values $t_i$ other than coalescing latency register value $t_{i\_max}$, set $t_i$ based on a ratio of $x_i$ to $x_{i\_max}$, and
  set the base timer register value b based on $x_{i\_max}$.

8. The integrated circuit chip of claim 7, wherein the mapping component is configured to set the respective ith coalescing latency register values $t_i$ according to $$t_i=x_i*t_{i\_max}/x_{i\_max}$$

for all i≠i_max.

9. The integrated circuit chip of claim 7, wherein the mapping component is configured to set the base timer register value b according to $$b=x_{i\_max}*B_0/t_{i\_max}$$

where $B_0$ is a defined clock count value.

10. The integrated circuit chip of claim 8, wherein the mapping component is configured to, in response to determining that all of the user-defined coalescing latency values $x_i$ are equal to zero, disable coalescing latency for the multiple data queues.

11. The integrated circuit chip of claim 4, wherein the mapping component is further configured to:
  in response to determining that tx_usec is greater than rx_usec:
    set the coalescing latency register value $t_{tx}$ for the transmit queue to the defined maximum coalescing latency register value $T_{max}$,
    set the coalescing latency register value $t_{rx}$ for the receive queue based on a ratio of tx_usec to tx_usec, and
    set the base timer register value b based on tx_usec.

12. A method for setting coalescing latencies, comprising:
  receiving, by a system comprising a processor, input data representing at least one user-defined coalescing latency for at least one data queue of multiple data queues, wherein the processor is configured to process data received via at least a first of the multiple data queues and to send processed data to at least a second of the multiple data queues;
  generating, by the system based on the input data, coalescing latency register values respectively corresponding to the multiple data queues and a base timer register value that is common to the multiple data queues, wherein coalescing latencies respectively associated with the multiple data queues are set based on the coalescing latency register values respectively associated with the multiple data queues and the base timer register value; and
  writing, by the system, the coalescing latency register values and the base timer register value to respective hardware registers of the system.

13. The method of claim 12, further comprising setting a coalescing latency, of the coalescing latencies, for an ith queue of the multiple data queue according to $b*t_i*\text{clk\_cycle}$, where i is an integer, b is the base timer register value, $t_i$ is an ith coalescing latency register value of the coalescing latency register values, and clk_cycle is a clock cycle of the system.

14. The method of claim 13, wherein the receiving comprises receiving at least one user-defined coalescing latency value $x_i$ for the multiple data queues, where i=0 through ($Q_{max}$−1), and where $Q_{max}$ is a number of the multiple data queues, and wherein the generating comprises:
  determining a maximum user-defined coalescing latency value $x_{i\_max}$ among the at least one user-defined coalescing latency value $x_i$,
  setting a coalescing latency register value $t_{i\_max}$ for one of the multiple data queues corresponding to the maximum user-defined coalescing latency value $x_{i\_max}$ equal to a defined maximum coalescing latency register value $T_{max}$,
  for respective ith coalescing latency register values $t_i$ other than coalescing latency register value $t_{i\_max}$, setting $t_i$ based on a ratio of $x_i$ to $x_{i\_max}$, and
  setting the base timer register value b based on $x_{i\_max}$.

15. The method of claim 14, wherein the setting $t_i$ based on the ratio of $x_i$ to $x_{i\_max}$ comprises setting the respective ith coalescing latency register values $t_i$ according to $$t_i = x_i * t_{i\_max} / x_{i\_max}$$

for all i≠i_max.

16. The method of claim 14, wherein the setting the base timer register value b comprises setting the base timer register value b according to $$b = x_{i\_max} * B_0 / t_{i\_max}$$

where $B_0$ is a defined clock count value.

17. The method of claim 14, wherein the generating comprises, in response to determining that all of the user-defined coalescing latency values $x_i$ are zero for all i=0 through ($Q_{max}$−1), disabling coalescing latency for the multiple data queues.

18. A system-on-chip, comprising:
  a central processing unit configured to process data received via at least one receive queue of multiple data queues and to send processed data to at least one transmit queue of the multiple data queues,
  a base timer register configured to store a base timer value that is shared by the multiple data queues;
  coalescing latency registers configured to store respective coalescing latency values associated with the multiple data queues, wherein respective coalescing latencies for the multiple data queues are set based on the base timer value and the coalescing latency values;
  a user interface component configured to receive input data defining user-defined coalescing latency values $x_i$ for the multiple data queues, where i=0 through ($Q_{max}$−1), and where $Q_{max}$ is a number of the multiple data queues; and
  a mapping component configured to:
    determine a maximum user-defined coalescing latency value $x_{i\_max}$ among the user-defined coalescing latency values $x_i$,
    set a coalescing latency value $t_{i\_max}$ for one of the multiple data queues corresponding to the maximum user-defined coalescing latency value $x_{i\_max}$ equal to a defined maximum coalescing latency register value $T_{max}$,
    for respective ith coalescing latency register values $t_i$ other than coalescing latency value $t_{i\_max}$, set $t_i$ based on a ratio of $x_i$ to $x_{i\_max}$,
    set the base timer value b based on $x_{i\_max}$,
    write the coalescing latency values $t_i$ to the coalescing latency registers, and
    write the base timer value b to the base timer register.

19. The system-on-chip of claim 18, wherein the mapping component is further configured to set the respective ith coalescing latency values $t_i$ according to $$t_i = x_i * t_{i\_max} / x_{i\_max}$$

for all i≠i_max.

20. The system-on-chip of claim 18, wherein the mapping component is configured to set the base timer value b according to $$b = x_{i\_max} * B_0 / t_{i\_max}$$

where $B_0$ is a defined clock count value.

21. The system-on-chip of claim 18, wherein the mapping component is configured to, in response to determining that all of the user-defined coalescing latency values $x_i$ are equal to zero, disable coalescing latency for the multiple data queues.

* * * * *

UNITED STATES PATENT AND TRADEMARK OFFICE
CERTIFICATE OF CORRECTION

PATENT NO. : 9,965,419 B1
APPLICATION NO. : 15/015338
DATED : May 8, 2018
INVENTOR(S) : Wen et al.

It is certified that error appears in the above-identified patent and that said Letters Patent is hereby corrected as shown below:

In the Claims

Column 13,
Line 35, "$t_{tx} = tx\_usec * t_{rx}/tx\_usec$" should read --$t_{tx} = tx\_usec * t_{rx}/rx\_usec$--;
Line 44, "tx_usec" should read --rx_usec--;
Line 50, "tx_usec" should read --rx_usec--.

Column 14,
Line 32, "tx_usec" should read --rx_usec--.

Signed and Sealed this
Thirtieth Day of October, 2018

Andrei Iancu
*Director of the United States Patent and Trademark Office*